US012808441B2

(12) United States Patent
Menno et al.

(10) Patent No.: US 12,808,441 B2
(45) Date of Patent: Nov. 24, 2026

(54) SEAL AND VALVE SYSTEM USING THE SAME

(71) Applicant: CMF Global, Inc., Chula Vista, CA (US)

(72) Inventors: Christopher A. Menno, Jupiter, FL (US); Dean P. Chaltas, Temecula, CA (US)

(73) Assignee: CMF Global, Inc., Chula Vista, CA (US)

( * ) Notice: Subject to any disclaimer, the term of this patent is extended or adjusted under 35 U.S.C. 154(b) by 0 days.

(21) Appl. No.: 19/114,054

(22) PCT Filed: Sep. 27, 2023

(86) PCT No.: PCT/US2023/075192

§ 371 (c)(1),
(2) Date: Mar. 21, 2025

(87) PCT Pub. No.: WO2024/073462

PCT Pub. Date: Apr. 4, 2024

(65) Prior Publication Data

US 2026/0085759 A1 Mar. 26, 2026

Related U.S. Application Data

(60) Provisional application No. 63/512,816, filed on Jul. 10, 2023, provisional application No. 63/377,489, filed on Sep. 28, 2022.

(51) Int. Cl.
*F16K 5/06* (2006.01)

(52) U.S. Cl.
CPC .......... *F16K 5/0668* (2013.01); *F16K 5/0689* (2013.01)

(58) Field of Classification Search
CPC ............................ F16K 5/0668; F16K 5/0689
See application file for complete search history.

(56) References Cited

U.S. PATENT DOCUMENTS

| | | | | |
|---|---|---|---|---|
| 3,542,054 A * | 11/1970 | Works | F16K 5/227 | 137/246.22 |
| 4,911,408 A * | 3/1990 | Kemp | F16K 5/0673 | 251/315.08 |
| 6,290,207 B1 * | 9/2001 | Genga | F16K 31/046 | 251/174 |
| 6,669,171 B1 * | 12/2003 | Stunkard | F16K 5/0673 | 251/315.08 |
| 9,518,446 B2 * | 12/2016 | Reid | F16K 11/0876 | |
| 9,995,403 B2 * | 6/2018 | Seo | F16K 5/201 | |
| 2008/0230731 A1 | 9/2008 | Dalmasso | | |

(Continued)

OTHER PUBLICATIONS

International Search Report and Written Opinion from parent PCT/US23/75192. Jan. 26, 2024. 7 pages.
AVK Certus PE Ball Valve. Nov. 17, 2022. 2 pages.

*Primary Examiner* — Patrick C Williams
(74) *Attorney, Agent, or Firm* — FisherBroyles, LLP; Craig W. Mueller

(57) ABSTRACT

A ball valve having a seal that is less prone to damage is provided. The seal is substantially captured by a retainer and a housing portion of the ball valve, wherein only a small portion of the seal is exposed and in contact with the ball. Accordingly, the seal is less likely to bulge towards the ball and rotation of the ball associated with valve opening and closing will not damage the seal.

17 Claims, 5 Drawing Sheets

(56) References Cited

U.S. PATENT DOCUMENTS

| | | | |
|---|---|---|---|
| 2014/0137663 | A1 | 5/2014 | Evans et al. |
| 2014/0203203 | A1 | 7/2014 | Scattini |
| 2016/0102768 | A1 | 4/2016 | Lo Cicero |

* cited by examiner

SEAL AND VALVE SYSTEM USING THE SAME

This application is a national stage application under 35 U.S.C. 371 and claims the benefit of PCT Application No. PCT/US23/75192, having an international filing date of Sep. 27, 2023, which designated the United States, and which claims the benefit of U.S. Provisional Patent Applications Ser. Nos. 63/377,489, filed Sep. 28, 2022, and 63/512,816, filed Jul. 10, 2023, both entitled "Seal and Valve System Using the Same," the entire disclosures of which are incorporated by reference herein.

FIELD OF THE INVENTION

Embodiments of the present invention are generally directed to valves and valve seals used in irrigation systems.

BACKGROUND OF THE INVENTION

Irrigation systems are commonly used intermittently, wherein valves are employed to selectively control the release of water. Such valves are often stored within boxes accessible from a location adjacent to ground level to allow for repair and selective operation. Those of skill in the art will appreciate that valves often require replacement due to the failure of their moving parts. A valve's moving parts also can create failures in other valve components.

FIG. 1 is a schematic showing a ball valve 2 incorporated into an irrigation system comprised of a main line 6 that feeds an irrigation line 10. The ball valve is located a predetermined distance below the ground 14 and associated with a valve box 18. In operation, the ball valve 2 is opened manually or by automated means to allow fluid to travel from the main line 6 to the irrigation line 10.

Referring to FIG. 2, ball valves 2 generally consist of a housing 22 that accommodates a ball 26 interconnected to a stem 30. The ball 26, i.e., a spherical member, includes a passage 34 therethrough. Rotation of the ball 26 by the stem 30 selectively aligns the passage 34 with corresponding passages 34 in the housing, which allows fluid flow through the ball valve 2. Rotation of the stem 30 in the opposite direction positions the ball's outer surface adjacent to an inlet opening 46 and an outlet opening of the ball valve 2, thereby blocking fluid flow through the ball valve.

The ball 26 is seated within the ball valve 2 and maintained in place with a sealing member comprising upper and lower seal components. The seal components operatively engage the outer surface 42 of the ball, thereby allowing it to rotate freely while preventing fluid egress or ingress from the ball valve 2.

FIGS. 3A and 3B are partial cross-sectional views showing a commonly used sealing member 54 located between a retainer 58 and a connector 62 interconnected to the housing 22. Here, the connector 62 is abutted against an outer face 66 of the housing and a portion of the housing associated with the housing passage 34. In the configuration shown, the fluid passage 34 provided in the ball 26 and the housing 38 are aligned such that fluid can flow to the irrigation line (not shown), i.e., an open configuration. The retainer 58 is designed to selectively engage with an outer surface 70 of the connector 62 to maintain the position of the sealing member 54. In current designs, the sealing member is not retained adequately and is often dislodged by fluid turbulence and pressure within the ball valve. If the sealing member dislodges from the retainer, the edge of the ball passage will damage the sealing member when the valve is open or closed. In practice, sealing member 54 replacement is generally impossible, and a damaged seal means that the ball valve must be replaced. One of ordinary skill in the art will appreciate that this process is time-consuming and expensive.

It is a long-felt need in the field of ball valve design to provide a long-lasting valve. It is also desirable to provide a valve with long-lasting sealing members.

SUMMARY OF THE INVENTION

It is one aspect of some embodiments of the present invention to provide a seal that is not damaged when a ball valve is opened or closed. In the contemplated ball valve, the operative engagement of the ball and the seal is minimal such that an edge associated with an opening in the ball will not damage the seal when the valve is opened and closed. A retainer and associated components substantially surround the seal to achieve this goal.

The seal of one embodiment of the present invention has a generally triangular profile, wherein the seal surfaces defined by the triangle's sides contact corresponding surfaces of the retainer and associated components, e.g., the ball valve housing. In one configuration, a surface defined by a vertex of the triangle is the only portion of the seal that contacts the ball. The vertex may comprise a rounded surface that engages smoothly with the ball as the valve is opened and closed.

The seal of one embodiment is made of a compliant material suited to create a tight interface with the ball, yet stiff enough to resist internal valve pressure and fluid turbulence that compresses and twists prior art seals. One of ordinary skill in the art will appreciate that internal hydraulic forces and fluid dynamics often displace the seal from its seat, which causes valve leakage and/or seal damage.

A typical 2-inch diameter irrigation ball valve experiences pressures ranging from 80 to 140 PSI (with a maximum rated pressure of about 200 PSI), and handles flows up to about 164 GPM. During flushing, valves can experience flows ranging from 500-700 GPM. Those of ordinary skill in the art will appreciate that valves come in several sizes, e.g., 1 inch up to 16 inches, wherein smaller valves accommodate flows of 15 GPM and larger valves accommodate several thousand GPM flows. A 2-inch ball valve employing a seal and retainer of one embodiment was tested with fluid flows up to 750 GPM and pressures up to 240 PSI, and the contemplated seal design endured destructive testing with 100% seal retention in all samples, resulting in zero failures. In contrast, seals of the prior art design failed, wherein all tested seals were permanently herniated out of the pocket provided by the retainer under these extreme test conditions. The seal/retainer design described herein greatly increases product reliability and robustness.

The seal of one embodiment includes at least one radial protrusion extending from an outermost surface. The radial protrusions are designed to engage a corresponding retainer surface, thereby creating a barrier that limits the amount of debris and/or high-pressure fluid behind the seal that would urge it towards the ball more than desired.

Thus, it is one aspect of some embodiments of the present invention of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface, wherein the inner, lateral, and angled surfaces of the sealing member are interconnected by rounded surfaces; wherein the first length and third lengths are substantially the same, and the second and fourth lengths are substantially the same, wherein the retainer surrounds a majority of the sealing member; and wherein the length of the inner surface is substantially the same as the third length.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface, wherein the inner, lateral, and angled surfaces of the sealing member are interconnected by rounded surfaces; wherein the first length and third lengths are substantially the same, and the second and fourth lengths are substantially the same, wherein the retainer surrounds a majority of the sealing member; wherein the length of the inner surface is substantially the same as the third length; and wherein the inner surface of the sealing member is substantially planar and configured to be aligned with a longitudinal axis of the fluid line.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface, wherein the inner, lateral, and angled surfaces of the sealing member are interconnected by rounded surfaces; wherein the first length and third lengths are substantially the same, and the second and fourth lengths are substantially the same, wherein the retainer surrounds a majority of the sealing member; wherein the length of the inner surface is substantially the same as the third length; and wherein the lateral surface of the sealing member is substantially planar and configured to be generally perpendicular to a longitudinal axis of the fluid line.

It is still yet another aspect of some embodiments of the present invention some embodiments of the present invention to provide a ball valve employing a sealing system comprised of a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface, wherein the inner, lateral, and angled surfaces of the sealing member are interconnected by rounded surfaces; wherein the first length and third lengths are substantially the same, and the second and fourth lengths are substantially the same, wherein the retainer surrounds a majority of the sealing member; and wherein the length of the inner surface is substantially the same as the third length.

It is another aspect of some embodiments of the present invention of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; and wherein the first length and third lengths are substantially the same, and the second and fourth lengths are substantially the same, wherein the retainer surrounds a majority of the sealing member.

It is another aspect of some embodiments of the present invention of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner surface of the sealing member is substantially planar and configured to be aligned with a longitudinal axis of the fluid line.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the lateral surface of the sealing member is substantially planar and configured to be generally perpendicular to a longitudinal axis of the fluid line.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner surface of the sealing member is substantially planar and configured to be aligned with a longitudinal axis of the fluid line, and wherein the lateral surface of the sealing member is substantially planar and configured to be generally perpendicular to a longitudinal axis of the fluid line.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner, lateral, and angled surfaces of the sealing member are interconnected by rounded surfaces.

It is another aspect of some embodiments of the present invention to provide a ball valve sealing system comprising: a retainer configured to be positioned between a housing of a ball valve and a fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the length of the inner surface is substantially the same as the third length.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; and wherein the first length and third lengths are substantially the same, and the second and fourth lengths are substantially the same, wherein the retainer surrounds a majority of the sealing member.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner surface of the sealing member is substantially planar and configured to be aligned with a longitudinal axis of the fluid line.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the lateral surface of the sealing member is substantially planar and configured to be generally perpendicular to a longitudinal axis of the fluid line.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner surface of the sealing member is substantially planar and configured to be aligned with a longitudinal axis of the fluid line, and wherein the lateral surface of the sealing member is substantially planar and configured to be generally perpendicular to a longitudinal axis of the fluid line.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the inner, lateral, and angled surfaces of the sealing member are interconnected by rounded surfaces.

It is another aspect of some embodiments of the present invention to provide a ball valve comprising: a housing having a fluid inlet and a fluid outlet, the fluid inlet and fluid outlet configured to be interconnected to a fluid line; a ball with a channel therethrough positioned with the housing; a stem interconnected to the ball and operatively interconnected to the housing, wherein rotation of the stem rotated the ball to selectively align the channel with the fluid inlet and fluid outlet; a retainer configured to be positioned between the housing of the ball valve and the fluid line or a connector associated therewith, the retainer having a lateral surface of a first length associated with an angled surface of a second length; a sealing member having a triangular profile comprising a lateral surface of a third length, an angled surface of a fourth length, and an inner surface; wherein the first length and third lengths are substantially the same, and the second and fourth lengths are substantially the same, wherein the retainer surrounds a majority of the sealing member; and wherein the length of the inner surface is substantially the same as the third length.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
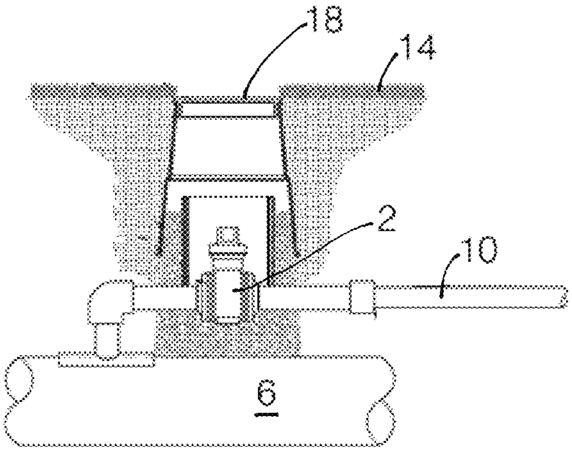
FIG. 1 is a schematic showing a ball valve integrated into an irrigation line.
Figure 2:
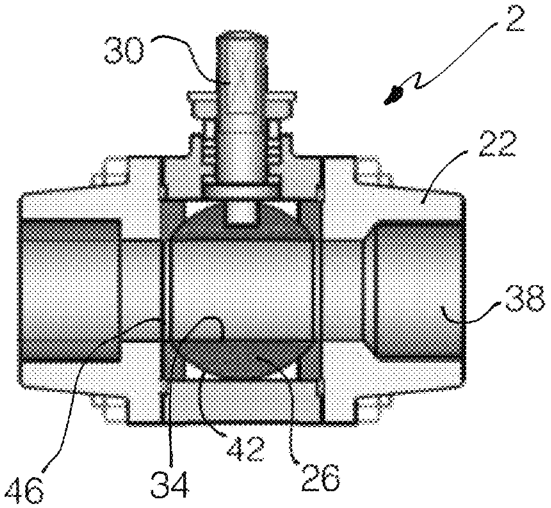
FIG. 2 is a cross-sectional view of a common ball valve.

The following component list and associated numbering found in the drawings is provided to assist in the understanding of one embodiment of the present invention:

| # | Component |
|---|---|
| 2 | Ball valve |
| 6 | Main line |
| 10 | Irrigation line |
| 14 | Ground |
| 18 | Valve box |
| 22 | Housing |
| 26 | Ball |
| 30 | Stem |
| 34 | Passage |
| 38 | Housing passage |
| 42 | Outer surface |
| 46 | Inlet opening |
| 50 | Outlet opening |
| 54 | Sealing member |
| 58 | Retainer |
| 62 | Connector |
| 66 | Outer face |
| 70 | Outer face |
| 126 | Ball |
| 154 | Sealing member |
| 158 | Retainer |
| 174 | Inner surface |
| 178 | Lateral surface |
| 182 | Angled surface |
| 186 | Contact surface |
| 190 | Protrusion |

-continued

| # | Component |
|---|---|
| 194 | Angled surface |
| 198 | Lateral surface |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 4-9 show a sealing member 154 of one embodiment of the present invention. As in the example shown in FIG. 3, the sealing member 154 is a toroid having an inner surface 174 generally perpendicular to a lateral surface 178, thereby defining an angled surface 182. The conjunction of the inner surface 174 and the lateral surface 178 defines a contact surface 186 that operatively engages the ball. The sealing member 154 may include at least one protrusion 190 extending from the angled surface 182. The protrusion 190, or plurality thereof, extend along an outer circumference of the sealing member 154 defined by the angled surface 182. The protrusion is designed to interface with a retainer surface, which will be described in further detail below.

As shown in FIGS. 5-8, the sealing member 154 is generally triangular-shaped, wherein the convergence of each side may be slightly rounded. In one embodiment, the length of the angled surface (x) is about 0.4-0.5 inches (1.02-1.3 cm) and the distance between the angled surface 182 and the contact surface 186 (y) is about 0.15-0.25 inches (0.4-0.64 cm). The circumference of the sealing member 154 defined by the inner surface 174 is about 7-7.5 inches (17.75-19.1 cm). One of ordinary skill in the art will appreciate that the sealing member may be sized to fit a ball valve of any size. The sealing member of one embodiment of the present invention is made of Nitrile, but other compliant materials may be used without departing from the scope of the invention.

Figure 3A:
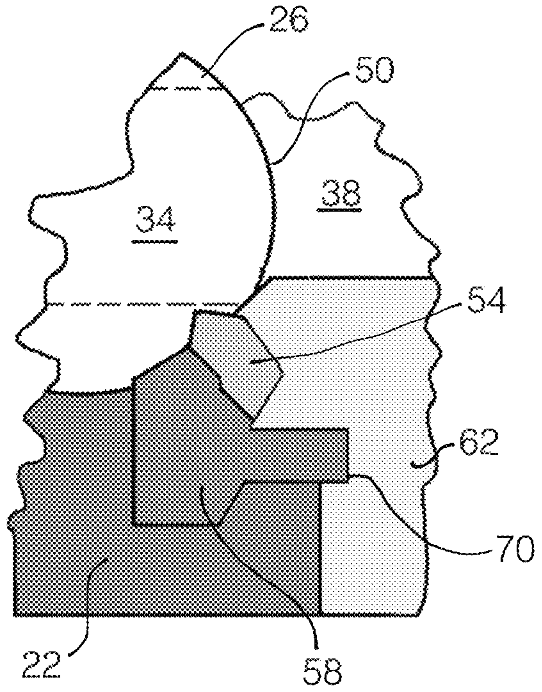
FIG. 3A is a partial cross section showing a common seal and retainer.
Figure 3B:
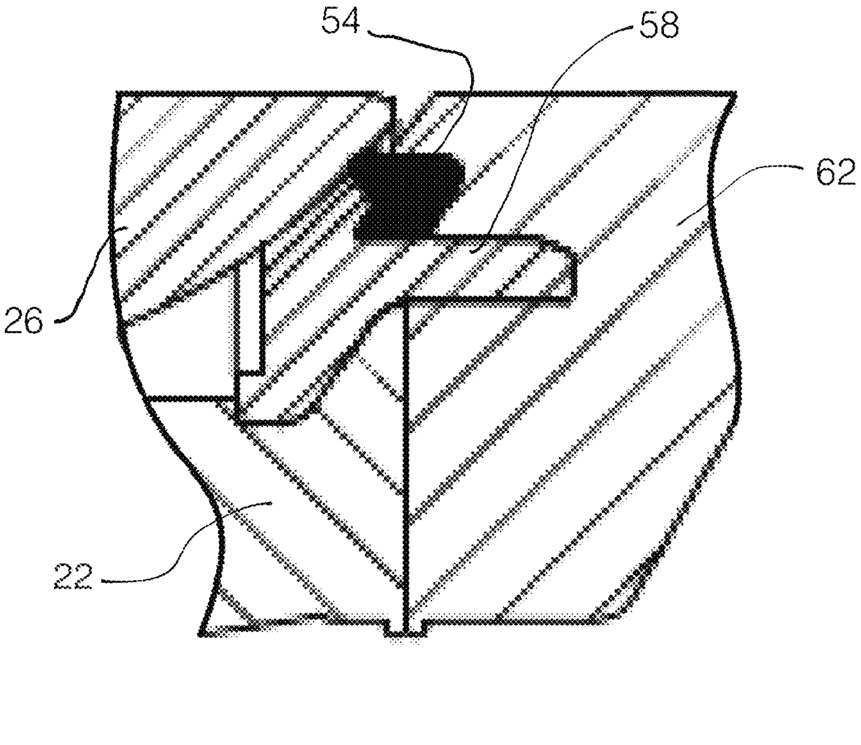
FIG. 3B is a partial cross section showing a common seal and retainer.
Figure 4:
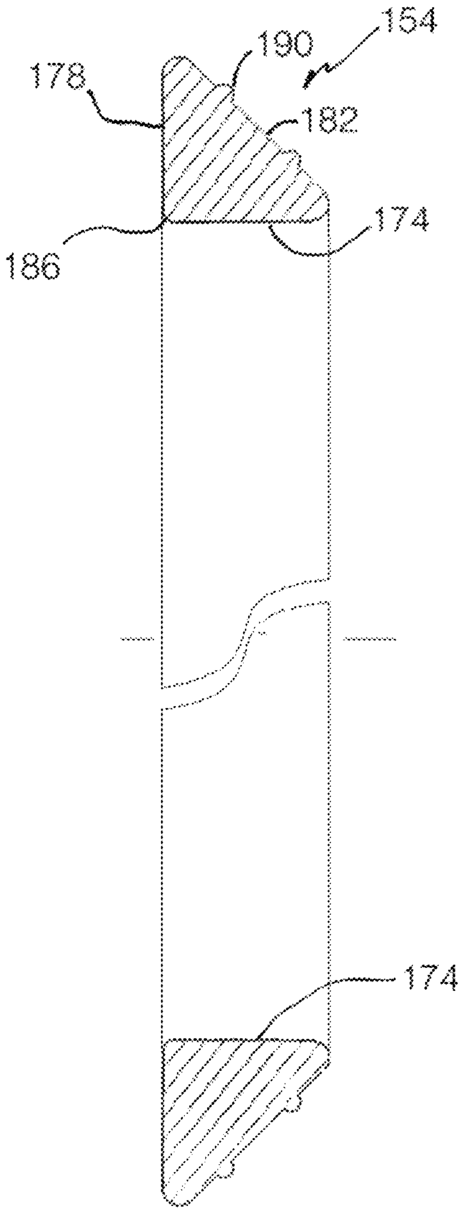
FIG. 4 is a cross-sectional view of a seal of one embodiment of the present invention.
Figure 6:
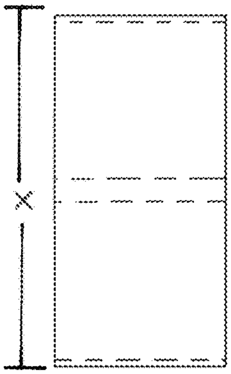
FIG. 6 is a top plan view of a portion of the seal shown in FIG. 5.
Figure 5:
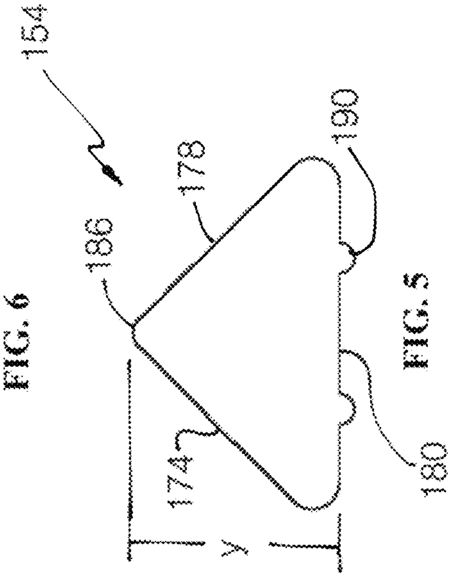
FIG. 5 is another cross-sectional view of the seal of one embodiment of the present invention.
Figure 8:
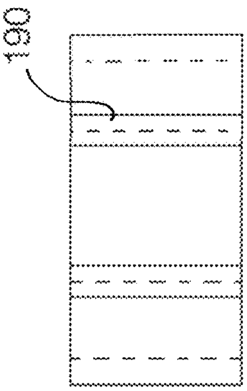
FIG. 8 is a bottom plan view of a portion of the seal shown in FIG. 5.
Figure 7:
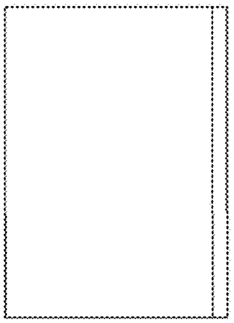
FIG. 7 is a side elevation view of a portion of the seal shown in FIG. 5.
Figure 9:
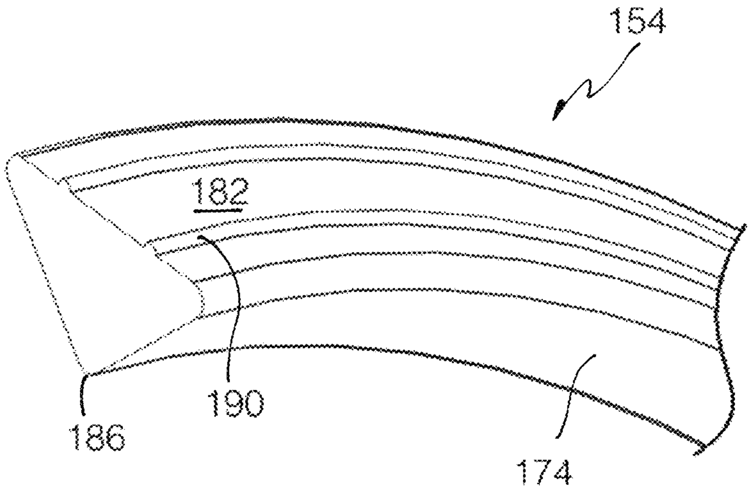
FIG. 9 is a perspective view of a portion of the seal showing FIG. 5.
Figure 10:
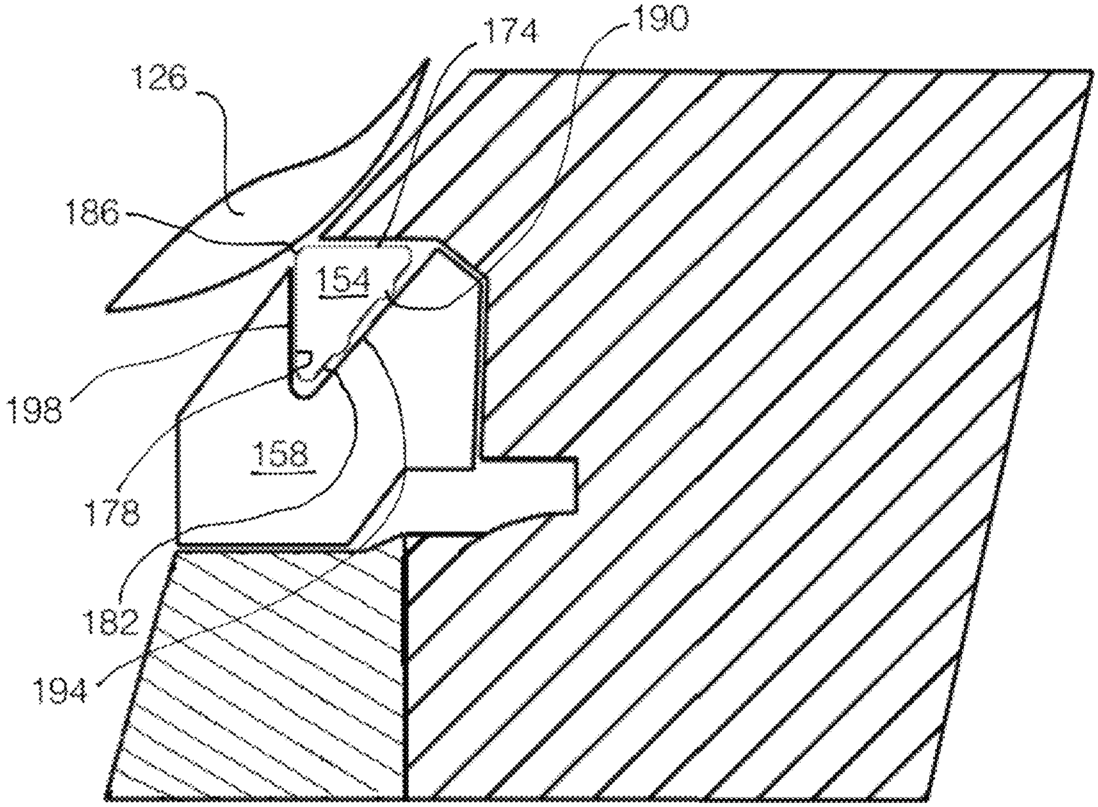
FIG. 10 is a cross-sectional view of the seal of one embodiment of the present invention and an associated retainer.

FIG. 10 is a partial cross-sectional view similar to that presented in FIG. 3 showing the sealing member 154 captured in a retainer 158 associated with a ball valve housing and associated components (not shown). Here, only the contact surface 186 operatively engages a ball 126, which increases sealing member life. Further, the retainer 158 surrounds the sealing member 154 on two sides, wherein the angled surface 182 is located adjacent to a complementary angled surface 194 of the retainer. The lateral surface 178 is likewise located adjacent to a corresponding lateral surface 198 of the retainer 158, which prevents movement of the sealing member.

The protrusions 190 possess outer extents that selectively engage the angled surface 194 of the retainer, thereby creating an obstruction that decreases the amount of debris or high-pressure fluid that can contact the angled surface 182 of the sealing member. Accordingly, pressure behind the seal, which normally tends to urge the seal from its seat, may be vastly reduced.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A ball valve sealing system comprising:

a retainer configured to be positioned between a housing of a ball valve and a fluid line or a connector associated therewith, the retainer having a lateral surface of a first length associated with an angled surface of a second length;

a sealing member having a triangular profile comprising a lateral surface of a third length, an angled surface of a fourth length, and an inner surface, wherein the inner, lateral, and angled surfaces of the sealing member are interconnected by rounded surfaces;

wherein the first length and third lengths are substantially the same, and the second and fourth lengths are substantially the same;

wherein the retainer surrounds a majority of the sealing member and captures the sealing member on two sides, with the angled surface of the sealing member located adjacent to a complementary angled surface of the retainer and the lateral surface of the sealing member located adjacent to a corresponding lateral surface of the retainer;

wherein a conjunction of the inner surface and the lateral surface of the sealing member defines a contact surface, and only the contact surface is configured to operatively engage a ball of the ball valve;

wherein the sealing member includes at least one protrusion extending from the angled surface, the at least one protrusion having an outer extent configured to selectively engage the angled surface of the retainer to create an obstruction that decreases an amount of debris or high-pressure fluid that can contact the angled surface of the sealing member; and wherein the length of the inner surface is substantially the same as the third length.

2. The system of claim 1, wherein the inner surface of the sealing member is substantially planar and configured to be aligned with a longitudinal axis of the fluid line.

3. The system of claim 1, wherein the lateral surface of the sealing member is substantially planar and configured to be generally perpendicular to a longitudinal axis of the fluid line.

4. The system of claim 1, wherein the at least one protrusion comprises a plurality of protrusions extending along an outer circumference of the sealing member defined by the angled surface.

5. A ball valve sealing system comprising:

a retainer configured to be positioned between a housing of a ball valve and a fluid line or a connector associated therewith, the retainer having a lateral surface of a first length associated with an angled surface of a second length;

a sealing member having a triangular profile comprising a lateral surface of a third length, an angled surface of a fourth length, and an inner surface;

wherein the first length and third lengths are substantially the same, and the second and fourth lengths are substantially the same;

wherein the retainer surrounds a majority of the sealing member and captures the sealing member on two sides, with the angled surface of the sealing member located adjacent to a complementary angled surface of the retainer and the lateral surface of the sealing member located adjacent to a corresponding lateral surface of the retainer; and wherein a conjunction of the inner surface and the lateral surface of the sealing member defines a contact surface, and only the contact surface is configured to operatively engage a ball of the ball valve.

6. The system of claim 5, wherein the inner surface of the sealing member is substantially planar and configured to be aligned with a longitudinal axis of the fluid line.

7. The system of claim 5, wherein the lateral surface of the sealing member is substantially planar and configured to be generally perpendicular to a longitudinal axis of the fluid line.

8. The system of claim 5, wherein the inner, lateral, and angled surfaces of the sealing member are interconnected by rounded surfaces.

9. The system of claim 5, wherein the length of the inner surface is substantially the same as the third length.

10. The system of claim 5, wherein the sealing member includes at least one protrusion extending from the angled surface, the at least one protrusion having an outer extent configured to selectively engage the angled surface of the retainer to create an obstruction that decreases an amount of debris or high-pressure fluid that can contact the angled surface of the sealing member.

11. A ball valve comprising:

a housing having a fluid inlet and a fluid outlet, the fluid inlet and fluid outlet configured to be interconnected to a fluid line;

a ball with a channel therethrough positioned within the housing;

a stem interconnected to the ball and operatively interconnected to the housing, wherein rotation of the stem rotates the ball to selectively align the channel with the fluid inlet and the fluid outlet;

a retainer configured to be positioned between the housing of the ball valve and the fluid line or a connector associated therewith, the retainer having a lateral surface of a first length associated with an angled surface of a second length;

a sealing member having a triangular profile comprising a lateral surface of a third length, an angled surface of a fourth length, and an inner surface;

wherein the first length and third lengths are substantially the same, and the second and fourth lengths are substantially the same;

wherein the retainer surrounds a majority of the sealing member and captures the sealing member on two sides, with the angled surface of the sealing member located adjacent to a complementary angled surface of the retainer and the lateral surface of the sealing member located adjacent to a corresponding lateral surface of the retainer:

wherein a conjunction of the inner surface and the lateral surface of the sealing member defines a contact surface, and only the contact surface operatively engages the ball; and wherein the sealing member includes at least one protrusion extending from the angled surface, the at least one protrusion having an outer extent configured to selectively engage the angled surface of the retainer to create an obstruction that decreases an amount of debris or high-pressure fluid that can contact the angled surface of the sealing member.

12. The ball valve of claim 11, wherein the inner surface of the sealing member is substantially planar and configured to be aligned with a longitudinal axis of the fluid line.

13. The ball valve of claim 11, wherein the lateral surface of the sealing member is substantially planar and configured to be generally perpendicular to a longitudinal axis of the fluid line.

14. The ball valve of claim 11, wherein the inner, lateral, and angled surfaces of the sealing member are interconnected by rounded surfaces.

15. The ball valve of claim 11, wherein the length of the inner surface is substantially the same as the third length.

16. The ball valve of claim 11, wherein the at least one protrusion comprises a plurality of protrusions extending along an outer circumference of the sealing member defined by the angled surface.

17. The ball valve of claim 11, wherein the sealing member is a toroid and the contact surface is rounded.

* * * * *